United States Patent

[11] 3,551,685

[72] Inventor Thomas M. Corry
 Goleta, Calif.
[21] Appl. No. 810,250
[22] Filed Mar. 25, 1969
[45] Patented Dec. 29, 1970
[73] Assignee General Motors Corporation
 Detroit, Mich.
 a corporation of Delaware

[54] VEHICLE ELECTRIC DRIVE SYSTEM
 8 Claims, 7 Drawing Figs.
[52] U.S. Cl............................................... 290/14,
 290/17; 318/146; 290/40; 318/147, 318/148,
 318/151, 318/158; 321/61
[51] Int. Cl..................................................... B60l 11/02
[50] Field of Search........................................... 290/14, 17,
 32, 40; 321/61; 180/65; 318/144, 148,
 151, 157, 140, 146, 147, 141, 142, 143

[56] References Cited
 UNITED STATES PATENTS
3,263,142 7/1966 Adoutte et al. ............... 290/14
3,333,130 7/1967 Brouee .......................... 290/14
3,499,164 3/1970 Ferre et al. .................... 290/17

Primary Examiner—G. R. Simmons
Attorneys—C. R. Meland and E. W. Christen

ABSTRACT: A motive power system for a vehicle comprising an engine driven alternating current generator coupled to an electric drive motor through a power converter. The engine for driving the alternating current generator is an internal combustion engine and a control system is provided for operating the engine near optimum fuel consumption over varying speeds of the engine. This control system includes a device which provides a signal that is a function of the position of an engine fuel controlling throttle and this signal is compared with a signal that represents engine speed. The speed of the generator and engine are then controlled in accordance with any error signal that is detected by varying field current of the generator in response to the error signal. The control mode that has just been described can be modified by the operator and is modified during certain conditions of operation including a mode of operation where engine speed is increased when the ratio of the output frequency of the alternating current generator to motor frequency is less than a predetermined value. In addition the system includes a speed limiting circuit for the engine and vehicle as well as a circuit that prevents lurching of the vehicle when the vehicle is being accelerated from a stopped position.

VEHICLE ELECTRIC DRIVE SYSTEM

The invention described herein was made in the course of work under a contract thereunder with the Department of the Army.

This invention relates to an electric drive system for motor vehicles and more particularly to an electric drive system wherein a prime mover such as an internal combustion engine drives an alternating current generator and where the output of the alternating current generator is applied to a brushless propulsion motor for the vehicle through a power converter circuit.

It is known in the art of electric drives for vehicles to provide electric drive systems which comprise a prime mover, a generator coupled to the prime mover and a traction motor connected to a driving wheel which receives power from the generator. Typical systems of this type are found on diesel-electric locomotives where an alternating current generator is driven by a diesel engine and where the output voltage of this generator is rectified to direct current and then applied to a plurality of series commutator type DC traction motors.

The present invention is directed to a motive power system for a vehicle which again includes a prime mover, a generator, and a motor coupled to a wheel of the vehicle and energized by the generator to provide motive power for the vehicle. The present invention, as contrasted to systems which use direct current commutator type of traction motors, utilizes a brushless motor and a solid-state power converter connected between an alternating current generator and the brushless motor for controlling the frequency of an alternating voltage which is applied to the brushless motor.

One of the objects of this invention is to provide a motive power system for a vehicle of the type that has just been described and to provide a system wherein fuel consumption by the prime mover is maintained near an optimum condition over a predetermined speed range of the prime mover. In carrying this object forward the prime mover takes the form of an internal combustion engine which drives the rotor of the alternating current generator. An accelerator pedal which controls the position of a fuel controlling throttle valve for the engine is coupled to a device which provides an electrical signal that is a function of throttle valve setting and this signal is compared against a signal representative of engine and alternator speed. The system includes means for varying the field current of the alternator in response to differences in voltages between the signals to thereby variably load the alternator to maintain the engine speed at a value which provides near-optimum fuel consumption for a given power level.

A further object of this invention is to provide a control system for a motive power system of the type that has been described wherein the near-optimum fuel consumption mode of operation is modified under certain conditions of operation of the system. As an example, it is desired in the motive power system that has been described to maintain a predetermined ratio between alternator output frequency and the motor input frequency which is determined by switching frequency of the power converter. If this ratio is not maintained there is a possibility of a short circuit occuring in the power converter and when the ratio of frequencies is below a predetermined value an engine race system operates to temporarily take control away from the near-optimum fuel consumption control system. To be more specific, the engine is purposely raced when the output frequency of the alternating current generator drops below approximately 2.5 times the motor frequency to thereby ensure reliable operation of the power converter connecting the alternating current generator and the motor.

Another object of this invention is to provide a control system of the type described wherein engine and vehicle speed is limited and wherein a system is provided for preventing the vehicle from lurching under conditions in which the alternating current generator is being driven at a high speed and the vehicle is proceeding from a stopped position.

Another object of this invention is to provide an electric drive propulsion system for a vehicle wherein the field current of a generator which supplies a traction motor is controlled as a function of the throttle valve setting of a fuel control device that controls the fuel-air mixture supplied to an engine that drives the generator and in response to engine speed and further wherein the field current to the generator can be controlled independently of the field controlling system that has just been described under certain conditions of operation. The throttle valve is coupled to an accelerator pedal and the system is arranged such that at times the field current is controlled by movement of the accelerator pedal rather than the near-optimum fuel consumption control system.

It will be appreciated from the foregoing that this invention contemplates providing a control system for an electric drive system that under steady state conditions provides near-optimum fuel consumption for the internal combustion engine but also provides a system wherein the near-optimum fuel consumption mode of operation can be modified by the driver or by certain conditions of operation that may occur during running of the vehicle.

IN THE DRAWINGS

Figure 1:
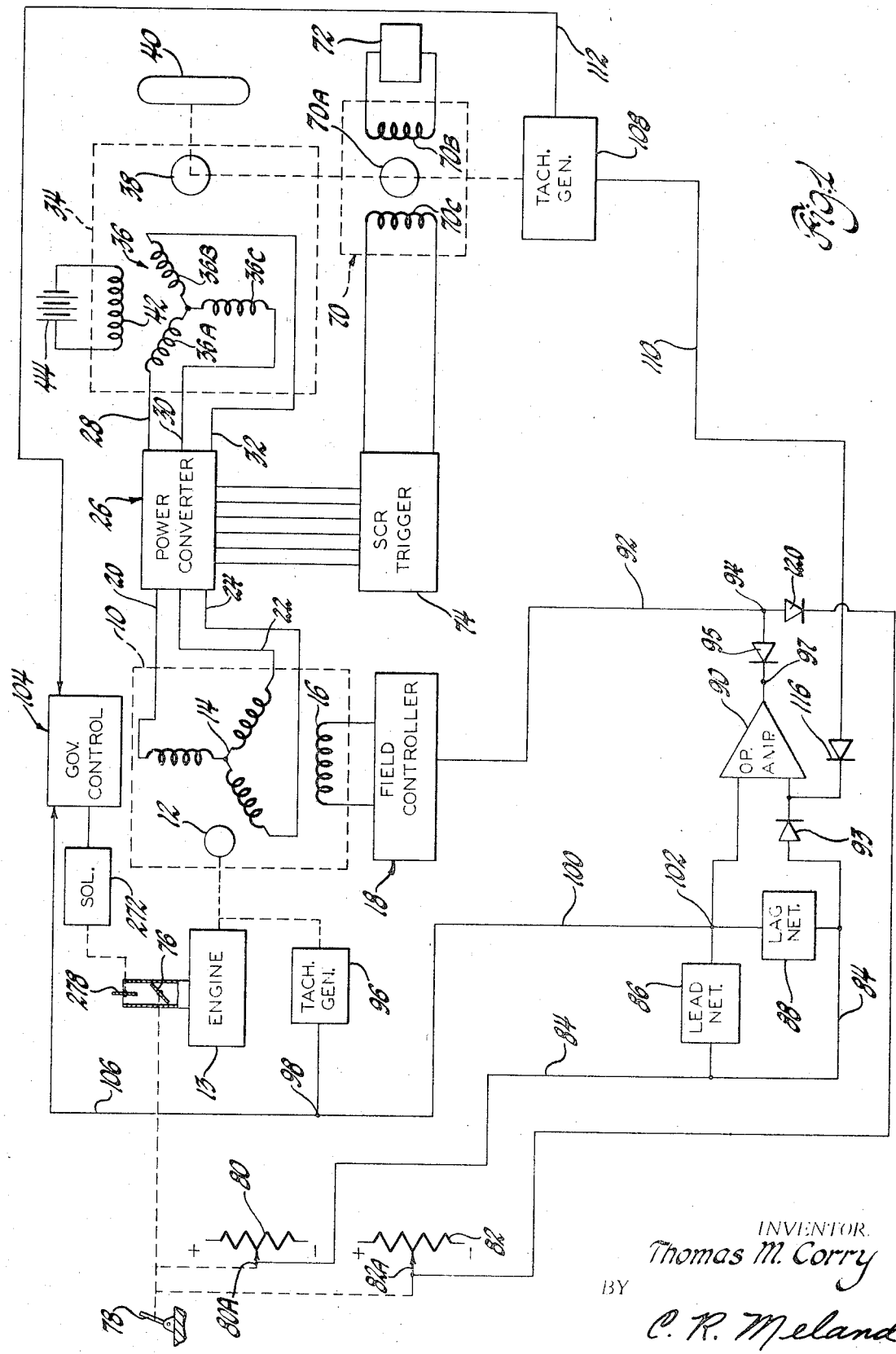
FIG. 1 is a schematic circuit diagram of a motive power system for a motor vehicle made in accordance with this invention.

Referring now to the drawings and more particularly to FIG. 1 the reference numeral 10 generally designates a polyphase alternating current generator having a rotor 12, a three-phase Y-connected output winding 14 and a field winding 16. The generator may take various forms but preferably is of the brushless inductor homopolar type. The output voltage developed in the output winding 14 is a function of the speed of rotation of the rotor and the magnitude of direct current supplied to the field 16 as is well known to those skilled in the art. The output frequency of generator 10 is a function of rotor speed and it is seen that the rotor 12 is mechanically coupled to and driven by a prime mover 13. The prime mover 13 is an internal combustion engine of the spark ignition type. The current supplied to field winding 16 of the generator 10 is controlled by a field controller designated by reference numeral 18 and shown in block diagram form in FIG. 1. The field controller is shown schematically in FIG. 4.

Figure 2:
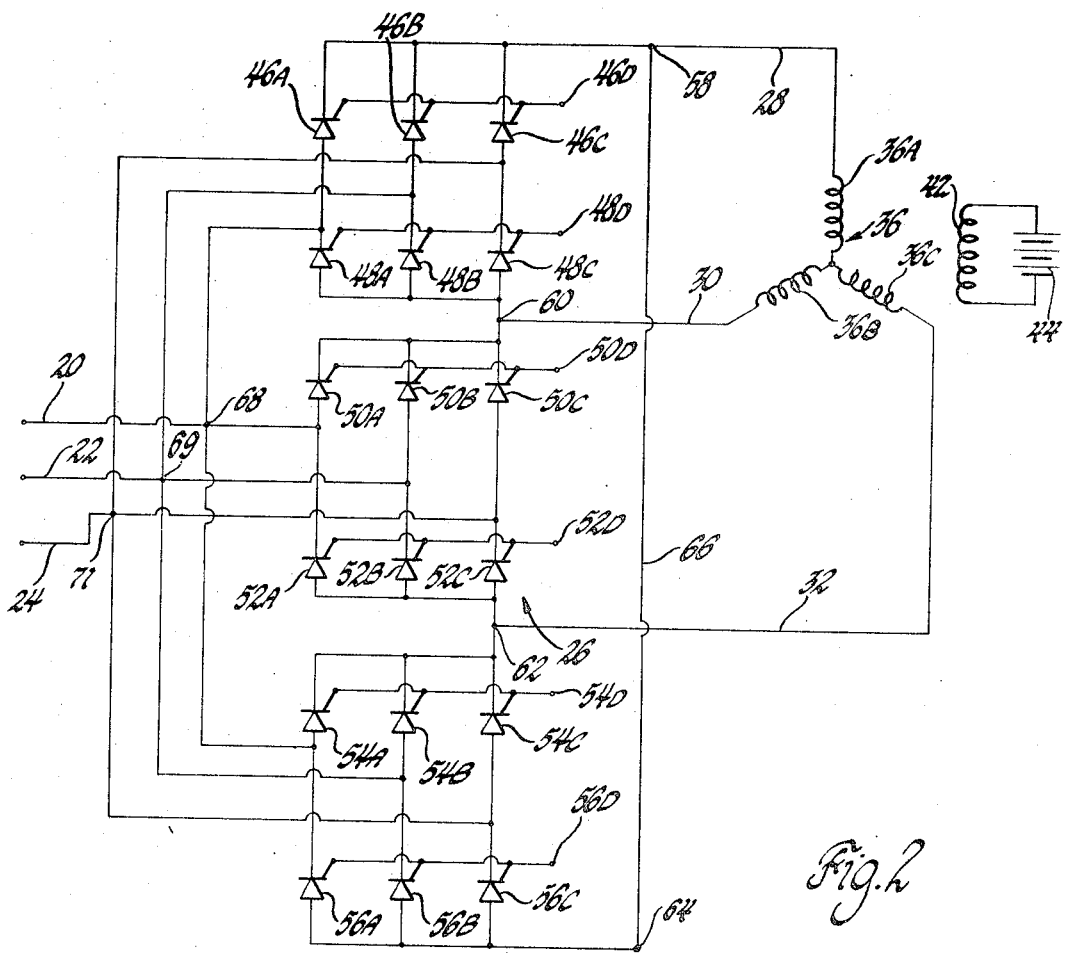
FIG. 2 is a schematic circuit diagram of the power converter shown in block diagram form in FIG. 1.

The output winding 14 of the alternating current generator is connected with power supply conductors 20, 22 and 24 which are connected with the input terminals of a power converter designated by reference numeral 26 and shown in detail in FIG. 2. The power converter, as will be more fully described hereinafter, is comprised of a plurality of switching devices which take the form of controlled rectifiers. The output terminals of the power converter 26 are connected with power supply conductors 28, 30 and 32 which supply power to a brushless motor designated by reference numeral 34. The motor 34 has a Y-connected three-phase stator winding designated by reference numeral 36 and comprised of phase windings 36A, 36B and 36C. This stator winding is a conventional three-phase Y-connected winding and can be wound on a stationary core of the motor. The motor 34 has a rotor 38 which is mechanically coupled to a driving wheel 40 of a motor vehicle. The motor 34 further includes a field winding 42 which is energized from a source of direct current 44. The motor 34 is of the brushless type disclosed in copending Pat. application Ser. No. 584,427, filed on Oct. 5, 1966, now U.S. Pat. No. 3,456,140, and assigned to the assignee of this invention. The stator winding 36 is supplied with an alternating voltage from power converter 26 in a manner to be more fully described hereinafter and the speed of rotation of the motor is determined by the frequency of the alternating voltage applied to its input terminals. The frequency of this alternating voltage is determined by the switching frequency of the controlled rectifiers that make up the power converter 26.

Referring now more particularly to FIG. 2 it is seen that the power converter 26 is comprised of 18 controlled rectifiers. These controlled rectifiers are designated respectively by reference numerals 46, 48, 50, 52, 54 and 56A, B and C. The cathodes of controlled rectifiers 46 are connected to a junction 58 which in turn is connected to phase winding 36A by conductor 28. The anodes of controlled rectifiers 48 and the cathodes of controlled rectifiers 50 are connected with a junction 60 which in turn is connected to phase winding 36B of the motor by conductor 30. The anodes of controlled rectifiers 52 and the cathodes of controlled rectifiers 54 are connected with a junction 62 which in turn is connected to phase winding 36C of the motor by conductor 32. The anodes of controlled rectifiers 56 are connected with a junction 64 and this junction is connected to junction 58 by a conductor 66.

The AC input power conductors in FIG. 2 are designated by reference numerals 20, 22 and 24 which are connected to the alternating current generator 10 as shown in FIG. 1. The input conductor 20 is connected with a junction 68 and it is seen that this junction is electrically connected to junctions located respectively between pairs of controlled rectifiers 46A and 48A, 50A and 52A and 54A and 56A. In a similar fashion input power supply conductor 22 is connected with junction 70 and it in turn is connected between pairs of controlled rectifiers as shown in FIG. 2. The power input conductor 24 is connected to junction 72 and it is connected between pairs of controlled rectifiers 46C and 48C, 50C and 52C and 54C and 56C.

The gates of controlled rectifiers 46 are connected together and to a terminal 46D. In a similar fashion the gates of the other groups of controlled rectifiers are connected together and respectively to terminals 48D, 50D, 52D, 54D and 56D.

Figure 3:
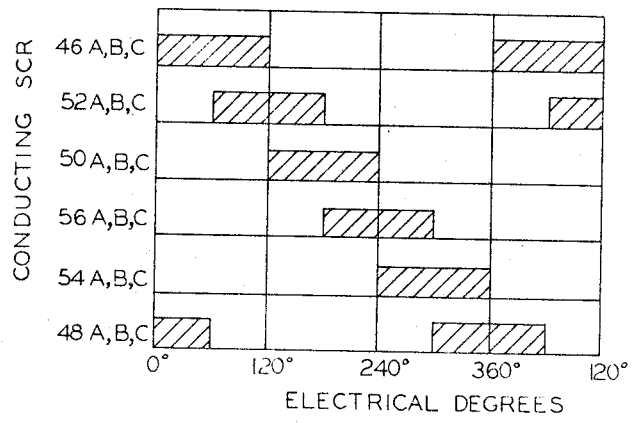
FIG. 3 is a graphical representation of the conducting periods of the controlled rectifiers of the power converter shown in FIG. 2 plotted against electrical degrees.

The controlled rectifiers of the power converter 26 are gated conductive by a control device which is to be described and are gated conductive in accordance with the chart shown in FIG. 3. The cross hatched areas of this chart indicate the conducting periods for a given group of three controlled rectifiers plotted against electrical degrees.

From an inspection of FIG. 3 it is seen that from 0 to 60 electrical degrees the groups of controlled rectifiers 46 and 48 are gated to a conductive condition. This is accomplished by applying a direct current signal to the junctions 46D and 48D which biases the commonly connected gates of controlled rectifiers 46 and 48 positive with respect to their cathodes to thereby gate these two groups of controlled rectifiers conductive. It will be appreciated that when controlled rectifiers 46 and 48 are gated conductive they, in effect, form a three-phase full-wave bridge rectifier having AC input terminals connected with the three phase alternating current supplied by generator 10. As a result of this the junctions 58 and 60 in effect form direct current output terminals for the bridge rectifier which are connected with phase windings 36A and 36B of the motor. This means that a direct current is supplied to phase windings 36A and 36B during the first 60° period illustrated in FIG. 3.

Between 60 and 120 electrical degrees the gate signal is removed from controlled rectifiers 48, is maintained on controlled rectifiers 46 and another signal is applied to the gates of controlled rectifiers 52. Since the controlled rectifiers are connected with an alternating current circuit they will be commutated or in other words turned off by the alternating current so that when the gate signal is removed from controlled rectifiers 48 they will be biased nonconductive. The controlled rectifiers of a group do not turn off simultaneously due to the phase relationship of the polyphase alternating current and in fact the controlled rectifiers are turned off one at a time depending upon the instantaneous polarities of their respective anodes and cathodes.

From 60 to 120 electrical degrees (FIG. 3) it will be appreciated that controlled rectifiers 46 and 52 now form a three phase full-wave bridge rectifier connected with phase windings 36A and 36C. Therefore, between 60 and 120 electrical degrees, as illustrated in FIG. 3, the phase windings 36A and 36C are energized while phase winding 36B is deenergized when controlled rectifiers 48 are turned off substantially at the 60° point.

From the foregoing it will be appreciated that during the first 120° the phase winding 36A was energized for the entire 120° period whereas phase windings 36B and 36C were energized for 60° of the first 120° period.

By following the chart shown on FIG. 3 it is clear that each phase winding of the stator winding 36 is energized with positive and negative current pulses having a duration of 120° separated by off periods of 60°. In this regard it will be appreciated that the current can be reversed through each phase winding. As an example, the current can flow in a reverse direction through phase winding 36A from the direction of current flow in this winding during its first 120° conduction period as when controlled rectifiers 56 and 50 are gated conductive between 180° and 240°. The same is true when controlled rectifiers 56 and 54 are gated conductive for example during the period between 240° and 300°.

In summarizing the operation of the power converter 26 shown in FIGS. 1 and 2 it will be evident that a three phase current is applied to the three phase winding 36 of the motor due to the switching of the groups of the controlled rectifiers. The voltage applied to a given phase winding is essentially a square wave similar to that provided by a bridge rectifier. The frequency of this current will be determined by the switching frequency of these groups of controlled rectifiers and this frequency, as will now be described, is a function of the speed of rotation of the rotor 38 of the motor. Moreover, the instant of energization of a particular phase winding is controlled by the position of the rotor relative to the stator winding 36.

In order to control the switching frequency of the groups of controlled rectifiers as a function of rotor speed and to control the energization of a given phase winding as a function of rotor position the system of FIG. 1 includes a rotor position sensing device which is generally designated by reference numeral 70. This sensing device 70 is preferably of the type shown in the U.S. Pats. to Campbell et al., 3,320,565 and to Huntzinger et al., 3,395,328. Thus, the rotor position sensor includes a disc 70A which is mechanically coupled to the rotor 38 of the drive motor 34 and therefore rotates at a speed which is a function of drive motor speed and vehicle speed. The disc 70A controls the coupling between a transformer having a primary winding 70B and a secondary winding 70C. The primary winding 70B is connected with a source of radio frequency signals designated by reference numeral 72. The disc 70A has a number of circumferentially spaced slots as shown in the above mentioned Campbell et al. patent and when these slots are positioned between the windings they permit a coupling between the primary and secondary windings. This disc could take other shapes as long as it controls the coupling between the primary and secondary winding and may for example, take the form shown in U.S. patent application Ser. No. 763,124, filed on Sept. 27, 1968, now U.S. Pat. No. 3,483,458, and assigned to the assignee of this invention. The number of slots in the disc 70A or the shape of the disc is constructed in accordance with the number of poles of the motor 34 and the system is arranged so that groups of controlled rectifiers will be gated conductive for 120° periods as shown in the chart of FIG. 3.

Although only one primary and secondary winding has been illustrated for the position sensor 70 the system will require six primary and six secondary windings where the power converter has six groups of controlled rectifiers with each secondary winding operating to control a group of controlled rectifiers.

The secondary winding 70C is connected with a controlled rectifier trigger circuit generally designated by reference numeral 74 and having six output lines which are connected respectively to the gates of the groups of the controlled rectifiers shown in FIG. 2. The triggering circuit 74 includes six bistable switching circuits preferably comprised of transistors of the type illustrated in the above mentioned patents 3,320,565 and 3,395,328 which provide gate to cathode voltages for the groups of controlled rectifiers to thereby control the conductivity of these controlled rectifiers according to the chart of FIG. 3. It will of course be appreciated that six bistable circuits are required, one for each secondary winding of the position sensor 70, and these have not been illustrated in order to simplify the disclosure of this invention. It will of course be appreciated that the trigger circuit 74 for the controlled rectifiers may utilize transformer coupling if desired as long as the system operates to gate the controlled rectifiers conductive in accordance with the chart shown in FIG. 3.

It will be evident to those skilled in the art that various position sensing devices, other than the one disclosed herein, can be utilized to gate the groups of controlled rectifiers conductive as a function of the position of rotor 38. It will also be appreciated by those skilled in the art that the output frequency of the converter 26 is directly related to the speed of rotation of the rotor 38 of the motor 34.

The present invention includes a control system for controlling the current applied to the field 16 of the alternator 10 as a function of engine speed and throttle valve setting. To this end a carburetor throttle valve 76 which controls the supply of fuel and air to the internal combustion engine 13 is mechanically coupled to an accelerator pedal 78 in the usual fashion. The accelerator pedal is further mechanically coupled to the slider 80A of a potentiometer 80 which is adjusted in accordance with throttle valve opening or angle. The potentiometer is connected with a source of direct current, not illustrated, and the voltage at slider 80A which changes with accelerator pedal setting is applied to a line 84. The line 84 is connected with a led network 86 and with a lag network 88 which are more fully described hereinafter. The line 84 is also coupled to an operational amplifier 90 through a diode 93. The operational amplifier 90 is connected with a line 92 at junction 94 through diode 95 connected with junction 97. The line 92 is connected to the field controller 18 coupled with field winding 16. The operational amplifier 90 therefore receives a direct voltage signal which is a function of accelerator pedal position and throttle valve opening. In addition this operational amplifier receives a direct voltage signal which is a function of the speed of engine 13. The direct voltage signal which is a function of engine speed is developed by a tachometer generator designated by reference numeral 96. The tachometer generator 96 is mechanically coupled to the shaft of the engine 13 and develops a direct voltage at junction 98 which is a function of engine speed. This tachometer generator 96 can take a wide variety of forms and may be for example a direct current tachometer generator or a rectified alternating current tachometer generator. Moreover, this device may take the form of a pulse generator of known construction which develops a series of pulses the frequency of which are a function of engine speed. Where a pulse generator is utilized it is coupled to a circuit which provides a direct voltage as a function of the frequency of the pulses or in other words a frequency to voltage converter.

The direct voltage appearing at junction 98, which is a function of engine speed, is applied to the operational amplifier 90 through a conductor 100 and junction 102. The direct voltage at junction 98 also is applied to a governor control 104 to be described via a line 106.

As will be more fully described hereinafter the amount of field current supplied to field winding 16 will be determined by throttle opening and engine speed. In other words, when the accelerator pedal is depressed to provide a predetermined throttle opening a voltage is developed at slider 80A of the potentiometer 80 which is an indication of the desired engine speed for a particular throttle setting. The engine speed is now sensed by tachometer generator 96 and compared by the operational amplifier 90 and an error signal developed to predetermine the amount of field current to be applied to field winding 16. To pursue this further, if the engine speed is higher than that programmed by potentiometer 80 for a given throttle setting the field current will be increased with a result that the engine is slowed down due to increased loading of the engine by the generator 10. On the other hand, if engine speed is lower than that programmed for a desired throttle setting the field current is reduced to thereby cause an increase in engine speed to the desired value.

The control system shown in FIG. 1 has a second tachometer generator designated by reference numeral 108 which is mechanically coupled to the rotor of the motor 34 as illustrated in FIG. 1. The tachometer generator 108 applies a direct voltage to lines 110 and 112 which is a function of the speed of rotor 38 of the motor 34. The voltage of line 110 is utilized as an engine race control which is more fully described hereinafter and this circuit is coupled to the operational amplifier 90 through a diode 116. The purpose of the engine race control is to reduce the amount of current supplied to field winding 16 of the alternator 10 when the output frequency of the alternator is less than approximately 2.5 times the motor frequency. This will reduce the load on the engine 13 permitting the engine to increase its speed or to race to thereby increase the output frequency of the alternating current 10 to some value higher than 2.5 times the motor frequency. This arrangement is provided to prevent a malfunction in the power converter 26 such as a short circuit between conducting controlled rectifiers since it has been determined that for reliable operation of the power converter 26 the output frequency of the current developed by the converter must have a predetermined relationship with input frequency and the input frequency must be maintained at a ratio of 2.5 to 3 times motor frequency to maintain reliable operation.

The system of FIG. 1, in addition to the components that have been described, includes the potentiometer 82 having a slider 82A which is mechanically coupled to the accelerator pedal 78. The voltage developed at the slider 82A is coupled to junction 94 through a diode 120. The purpose of this circuit, as will be more fully described hereinafter, is to prevent lurching of the vehicle during the condition of operation where engine speed is high and when the vehicle is accelerating from a stopped position. This circuit, as will be described hereinafter, overrides the programmed current for the field winding for near or off-optimum fuel consumption when the accelerator pedal is initially depressed.

Figure 4:
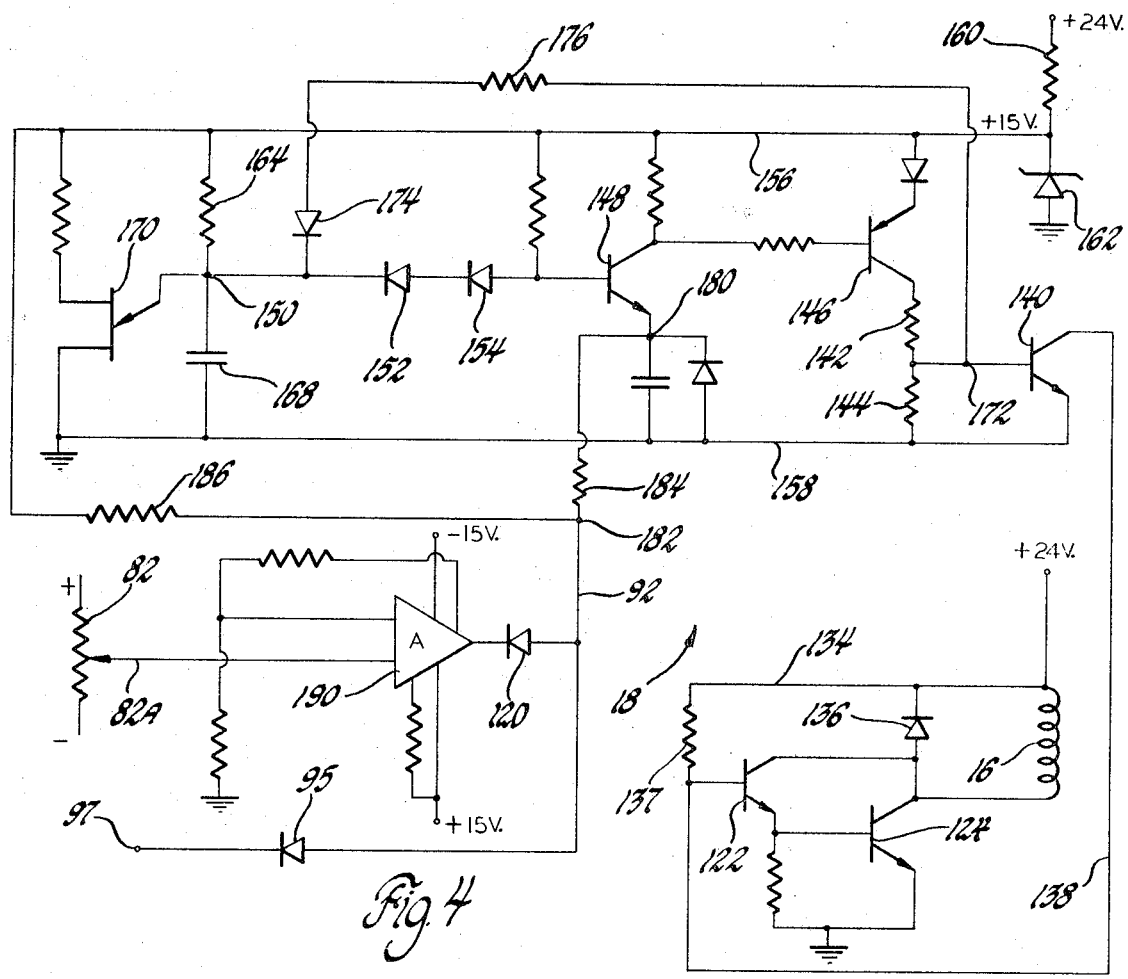
FIG. 4 is a schematic circuit diagram of the field controlling device for the alternating current generator illustrated in block diagram form in FIG. 1.

Referring now more particularly to FIG. 4 the field control circuit 18 is schematically illustrated. The field winding in FIG. 4 for the generator 10 is again designated by reference numeral 16 and it is seen that this field winding is connected across a 24 volt direct current source (not illustrated), through a transistor switching circuit comprised of transistors 122 and 124 connected in a well-known Darlington configuration. The usual field discharge diode 136 is provided. A bias circuit for transistor 122 is provided between positive conductor 134 and ground and this circuit includes resistor 137, conductor 138 and the collector-emitter of NPN transistor 140. It will be appreciated that when transistor 140 is biased conductive transistors 122 and 124 are biased nonconductive to interrupt field current. On the other hand, when transistor 140 is biased nonconductive transistors 122 and 124 will be biased to conduct to therefore apply field current to the field winding 16. The average field current is therefore controlled by switching the transistors 122 and 124 on and off in response to a control signal which is to be described.

In FIG. 4 the base of transistor 140 is connected between resistors 142 and 144 and these resistors are connected in series with an NPN transistor 146. The transistor 146 is coupled to an NPN transistor 148 and the base of this transistor is connected to a junction 150 through diodes 152 and 154. It is seen that transistors 146 and 148 are connected across power supply conductors 156 and 158 the conductor 158 being grounded as shown. The conductor 156 has a positive 15 volt potential applied thereto through a circuit including resistor 160 and Zener diode 162. This circuit is energized from a 24 volt source of direct current (not illustrated).

The junction 150 is connected between resistor 164 and capacitor 168 which have a predetermined RC time constant. The junction 150 is also connected with the emitter of a unijunction transistor 170 having its base electrodes connected respectively with the power supply conductors. The junction 150 is connected with a junction 172 by a diode 174 and a resistor 176. The emitter of transistor 148 is connected with a junction 180 which in turn is connected to a junction 182 through a resistor 184. The potential of junction 182 controls the switching of the field current control circuit and therefore ultimately controls the average field current supplied to field winding 16. It is seen that junction 182 is coupled to the power supply conductor 156 through a resistor 186.

The field control system shown in FIG. 4 further includes an operational amplifier 190 which is a Nexus Q10 Trima operational amplifier. This operational amplifier is coupled to conductor 92 through diode 120. The input of the operational amplifier 190 is connected to the slider 82A of potentiometer 82. The conductor 92 is also connected with diode 95 and this diode is connected to junction 97 shown in FIGS. 1, 4 and 5.

Figure 5:
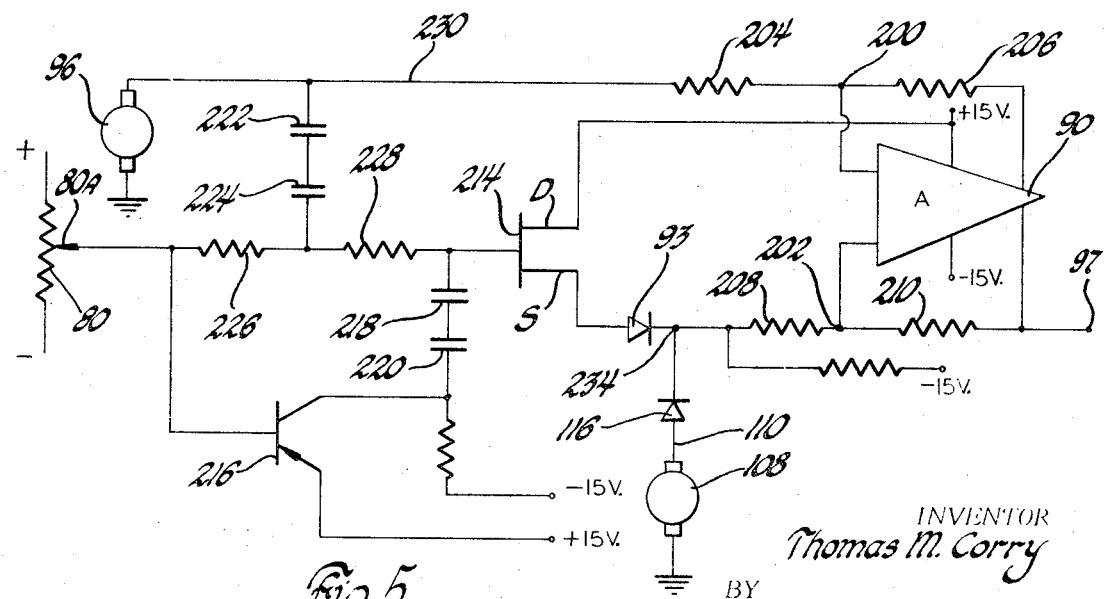
FIG. 5 is a schematic circuit diagram of a portion of the system illustrated in block diagram in FIG. 1.

Referring now more particularly to FIG. 5 a schematic circuit diagram is illustrated of the lead and lag networks 86 and 88 and the connections of the operational amplifier 90 with other components of the system. The operational amplifier 90 can take various forms but in the embodiment of the invention disclosed is a Burr-Brown Type 1504 operational amplifier. In FIG. 5 the operational amplifier 90 is connected with plus and minus 15 volts provided by a power supply which is not illustrated. In addition, the operational amplifier 90 is connected to junctions 200 and 202 located respectively between resistors 204 and 206 and 208 and 210. The resistors 204 and 208 have equal resistance values as do the resistors 206 and 210. The resistor 208 is connected in series with diode 93 which in turn is connected to the source electrode S of a field effect transistor 214. The drain electrode D of the field effect transistor 214 is connected to one of the terminals of the operational amplifier 90 and to the positive 15 volts supply. The lead and lag circuits comprise a transistor of the PNP type designated by reference numeral 216 operating as an inverter, capacitors 218 and 220, capacitors 222 and 224 and resistors 226 and 228 all connected schematically as shown in FIG. 5. The conductor 230 corresponds to conductor 100 in FIG. 1 and the tachometer generator 96 applies a direct voltage between conductor 230 and ground which is a function of engine speed. It is also seen that the resistor 226 is connected with the slider 80A of the programming potentiometer 80.

The junction 234 is connected between resistor 208 and diode 93 and is coupled to the positive side of tachometer generator 108 through diode 116. A direct voltage is therefore applied to junction 234 which is a function of the speed or rotation of the rotor 38 of the drive motor 34.

Figure 6:
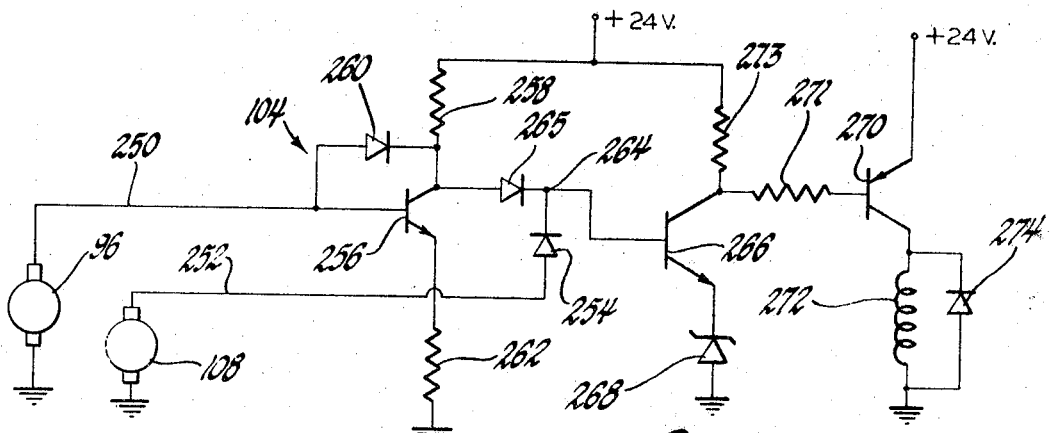
FIG. 6 is a schematic circuit diagram of the governor control illustrated in block diagram form in FIG. 1.

Referring now more particularly to FIG. 6 a schematic circuit diagram is illustrated which forms the governor control circuit 104. This control circuit receives an input voltage from tachometer generator 96 at input conductor 250 which corresponds to conductor 106 of FIG. 1. This circuit also receives a direct current signal at input conductor 252 from tachometer generator 108 which corresponds to conductor 112 shown in FIG. 1. The input conductor 252 is connected with a diode 254. The input conductor 250 is connected with the base of an NPN transistor 256 the collector of this transistor being connected to a positive 24 volts provided by a power supply (not shown) through a resistor 258. A diode 260 is connected across the base and collector of transistor 256 and the emitter of this transistor is connected to ground through a resistor 262. The collector of transistor 256 is connected to junction 264 by a diode 265. The junction 264 is connected with the base of an PNP transistor 266. The emitter of transistor 266 is connected to ground through a Zener diode 268. The collector of transistor 266 is connected to the base of an PNP transistor 270 through a resistor 271 and to the positive 24 volts through resistor 273. The collector of transistor 270 is connected with the coil 272 of a solenoid which controls the operation of another throttle valve for the engine designated by reference numeral 278 and illustrated in FIG. 1. A diode 274 is connected across the coil 272. The emitter of transistor 270 is connected to a positive 24 volts provided by a suitable direct current power supply, (not illustrated) the negative side of which is grounded. The solenoid coil 272 operates the valve 278 and moves the valve toward a closed position to throttle the engine when the solenoid coil 272 is energized. This can be accomplished by a direct connection between the solenoid and the throttle valve 278 or can also be accomplished by an arrangement wherein a fluid motor (not illustrated), for example a vacuum motor, operates the throttle valve and where the application of fluid power to the fluid motor is controlled by a valve (not shown) that is moved by the solenoid 272. Whatever linkage is used between the plunger of solenoid 272 and throttle valve 278 the valve is closed when solenoid 272 is energized and open when deenergized. The valve 278 is held open by some device such as a spring until coil 272 is energized. Where a vacuum motor is used the spring urges a diaphragm in a direction to open valve 278.

From an inspection of FIG. 6 it will be appreciated that the solenoid 272 will not be energized until transistor 270 is biased to conduct. The conduction of transistor 270 depends upon the conduction of transistor 266, that is, when transistor 266 is biased nonconductive transistor 270 is biased nonconductive and when transistor 266 is turned on the transistor 270 is turned on.

The signal developed by tachometer generator 96, which is a function of engine speed, will bias transistor 256 to a conductive condition which in turn biases transistors 266 and 270 nonconductive. The arrangement is such that between an idle condition of the engine 13 and approximately 3500 r.p.m. the transistor 256 is biased to conduct therefore biasing transistor 270 nonconductive and the throttle valve 278 is maintained in an open condition. In the event that engine speed exceeds 3500 r.p.m. the circuit is arranged such that the voltage developed by tachometer generator 96 will forward bias transistor 266 to turn on transistor 270 and therefore throttle the engine. This biasing circuit is through conductor 250, diode 260, diode 265, the base-emitter circuit of transistor 266 and Zener diode 268. When the breakdown potential of this circuit is exceeded by the voltage developed by tachometer generator 96 which corresponds to an engine speed that is in excess of 3500 r.p.m. transistor 266 turns on to therefore bias transistor 270 on which energizes the solenoid 272 to close the throttle valve 278.

The voltage developed by the tachometer generator 108, which is a function of drive motor speed, is also operable to throttle the engine 13 in the event that vehicle speed exceeds a predetermined speed. When the voltage developed by generator 108 exceeds a predetermined value the transistor 266 again will be biased conductive through conductor 252, diode 254, the base-emitter circuit of transistor 266 and Zener diode 268. The breakdown voltage of the Zener diode 268 again must be exceeded to cause transistor 266 to conduct and this takes place for example when the vehicle speed exceeds 60 miles per hour in a forward direction.

The operation of the electric drive system will now be described. In this description the off-optimum fuel control system will be described first. Assuming that an operator of the vehicle has depressed the accelerator pedal 78 to a desired position it is apparent that the throttle valve 76 will open or be moved to an angle which is a function of accelerator position. This will control the amount of fuel-air mixture supplied to the engine and at the same time a voltage is developed on slider 80A which is a function of accelerator pedal position. Assuming now a steady state condition of operation an input voltage is now applied to the control system shown in FIG. 5 from the potentiometer slider 80A which is a function of accelerator pedal position and throttle valve opening. The operational amplifier 90 responds not only to the voltage provided by the potentiometer but also responds to a voltage provided by the tachometer generator 96 which is a function of engine speed. The potentiometer has called for a certain engine speed as related to throttle valve opening and the voltages provided by the potentiometer and tachometer generator 96 are compared and the operational amplifier 90 energized such that a voltage is developed on output terminal 97 which controls field current through the system shown in FIG. 4 and previously described. If engine speed is higher than the speed programmed by potentiometer resistor 80 the field current will be increased to thereby apply an additional load to the engine to slow it down to the programmed speed. On the other hand if the engine speed is too slow for the speed programmed by potentiometer resistor 80 the field current is decreased reducing the loading of the alternator and therefore permitting the engine to speed up to the desired value.

Figure 7:
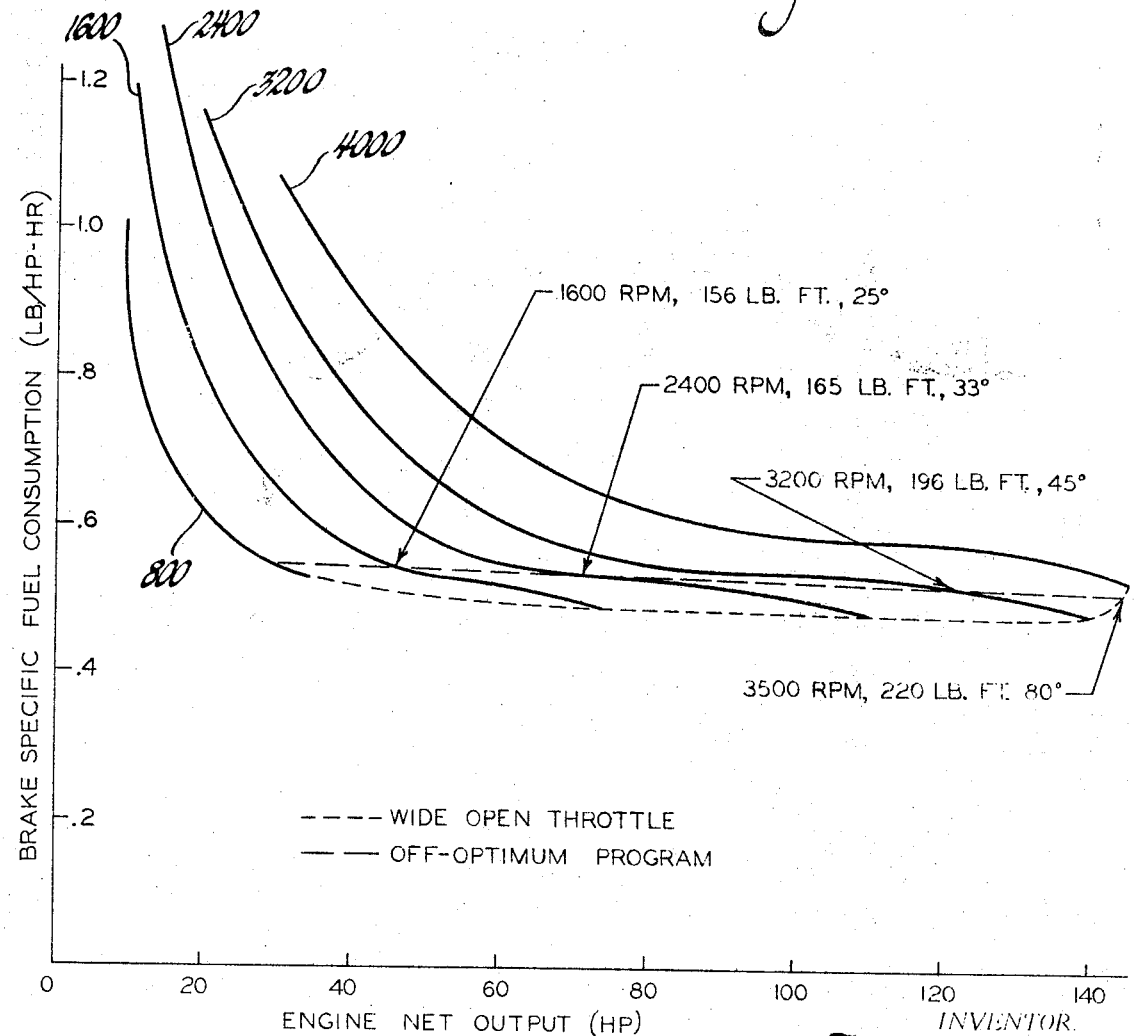
FIG. 7 are a set of curves plotting engine horsepower versus engine fuel consumption for the internal combustion engine that drives the alternating current generator of the power supply system of this invention.

FIG. 7 of the drawings illustrates the effect of this type of programming. In FIG. 7 engine output net horsepower is plotted against fuel consumption for various engine speeds. The dotted line in FIG. 7 indicates the operation which would take place should the engine be operated at wide open throttle whereas the dashed line indicates the program that is established by the control system of this invention. It will be appreciated from an inspection of FIG. 7 that various engine speeds could be used to provide a given horsepower output and the system of this invention provides an arrangement where fuel consumption is slightly in excess of the arrangement where the throttle valve is operated wide open.

There are three points noted in FIG. 7 indicating engine speed, torque output and throttle valve opening. Thus, at 1600 r.p.m. the output torque is 156 lb. ft. which corresponds to a 25° throttle opening. It is therefore seen that when the accelerator pedal 78 is moved to provide a 25° throttle opening the potentiometer resistor 80 is set to provide a speed of 1600 r.p.m. and this is maintained by varying the field current of the generator 10 to thereby provide one point on the off-optimum dashed line curve shown in FIG. 7. The other points on the dashed curve are established by the movement of the slider 80A in response to accelerator pedal position and therefore throttle valve opening.

The off-optimum program has certain advantages as compared to a system where the throttle would be maintained wide open and one of these advantages is the fact that the system is more responsive to driver control since the system responds to accelerator pedal position. Moreover, due to the provision of the lead and lag networks in the system the system will instantaneously respond to a change in accelerator pedal position and then revert back to the off-optimum program that has been described. Thus, assuming that the accelerator pedal is suddenly depressed a voltage is transmitted directly into the system through the lead network 86 which temporarily increases the field current supplied to the generator to temporarily increase output voltage. This input signal then subsides gradually due to the provision of the lag network and the system then reverts back to the off-optimum program where field current is controlled by engine speed and the setting of the slider 80A of the potentiometer.

While the system is operating in the off-optimum program other factors or policies may enter into the control of the system depending upon the instantaneous conditions of system operation. One control policy that will vary the off-optimum fuel consumption program is a condition where the input frequency to the power converter 26, which is alternator output frequency, becomes less than approximately 2.5 times the frequency of the current applied to the stator winding of motor 34. In the event that such a condition exists the control system operates to "race" the engine by reducing field current. This is accomplished by the output voltage of the tachometer generator 108 and the diode 116 which is connected with junction 234 as shown in FIG. 5. If the voltage developed by tachometer generator 108 as compared to the voltage developed by tachometer generator 96 reaches certain comparative values indicating that the output frequency of the generator 10 is less than 2.5 times the motor frequency the operational amplifier 90 will provide a control signal to the field control system shown in FIG. 4 which will decrease field current and thereby permit engine speed to increase. This voltage comparison is made by diodes 93 and 116. If this racing of the engine does not provide the proper frequency ratio between the output frequency of the generator and motor frequency the field current will be reduced to the point where there is no output voltage from the generator 10. It therefore is seen that this circuit which may be termed "race circuit" operates to unload the generator 10 when the described frequency ratio drops to the minimum acceptable value and the system will then temporarily operate in the race mode of operation rather than in the off-optimum fuel consumption mode of operation. It will of course be appreciated that the condition that has been described might occur when the vehicle is moving down a hill since under this condition the rotor speed of the motor which dictates power converter output frequency may increase whereas generator output frequency may stay substantially constant or even decrease. Since motor frequency is determined by vehicle wheel speed there is a possibility that the race circuit will be put into operation while moving down a hill or otherwise coasting.

The part of the control system which includes potentiometer resistor 82 and diodes 95 and 120 shown in FIG. 4 provide what may be termed a no lurch control policy or mode of operation for the system. Thus, when the operator initially depresses the accelerator pedal 78 and when the vehicle is stopped the engine speed increases with the result that the off-optimum control system may dictate a high field current to slow the engine down. Since this might apply excessive power to the drive motor with the result that the vehicle might lurch from a stopped position the potentiometer resistor 82 and diodes 95 and 120 are provided to prevent this. The slider 82A of the potentiometer resistor is moved as the accelerator pedal is depressed and applies a voltage to the cathode of diode 120 through the operational amplifier 190 (see FIGS. 1 and 4). If the cathode voltage of diode 120 is lower than the cathode voltage of diode 95 the accelerator pedal controls field current rather than the closed loop consisting of the programming potentiometer 80, the alternator field control circuit and the engine shaft tachometer circuit including tachometer generator 96. The system is arranged such that after the pedal is depressed sufficiently the cathode voltage of diode 120 exceeds the cathode voltage of diode 95 and the system then operates in the off-optimum fuel consumption program that has been described. When the field is initially controlled by potentiometer resistor 82 a field current is gradually applied of such a magnitude as to not permit sudden lurching of the vehicle.

The engine and fuel speed limit control system consists of the circuit shown in FIG. 6 which has been described. As previously described the throttle valve 278 will be moved to a closed position to throttle the engine whenever the vehicle speed exceeds a predetermined speed or when engine speed exceeds a predetermined speed, for example 3500 r.p.m. It is pointed out that the circuit of FIG. 6 has a safety feature in that a signal is required from the engine driven tachometer 96 to prevent the throttle valve 278 from closing. This feature ensures that the system will not operate if the engine speed sensing circuit has somehow failed or in other words a condition where no direct voltage is applied to conductor 250 shown in FIG. 6.

From the foregoing description it will be appreciated that the control system can operate with different policies or modes of operation depending upon the instantaneous condition of operation of the vehicle and depending upon operator commands. In this regard the off-optimum program for the engine which is intended to provide near-optimum fuel consumption is modified by the race circuit, the no lurch circuit and the speed limit mode of operation.

By way of example, and not by way of limitation, certain components of the system may have the following characteristics. The internal combustion engine 13 can be a six cylinder gasoline spark ignition type of engine having a displacement of 302 cubic inches and a net 140 horsepower input to the alternator at 3500 r.p.m. The torque of this engine can be approximately 243 lb. ft. maximum at 1400 r.p.m.

The alternator 10 is preferably a brushless homopolar inductor alternator having a nominal 100 kw rating. The output frequency of this alternator can be 3500 $H_z$ at 15,000 r.p.m. The open circuit voltage is 370 volts and the field is excited from a direct current source of 28 volts and 840 watts. Maximum r.p.m. for the generator is approximately 15,000 r.p.m. The propulsion motor, as previously pointed out, is of the type shown in Pat. application Ser. No. 584,427, filed Oct. 5, 1966 and has a speed range of 0 to 17,000 r.p.m. The rating of this motor is a nominal 20 horsepower over a 16 to 1 speed range. The frequency of this motor is 850 Hz at 17,000 r.p.m.

The ratings of the controlled rectifiers of the power converter should be 800 volts 110 ampere RMS rating.

The engine 13 and the generator 10 are mechanically connected by a gear box which is not illustrated. This gear box can be of the single stage spur gear type having a step-up ratio of 4.3 to 1.

The tachometer generator 108 in FIG. 1 is shown mechanically coupled to the rotor of the drive motor to provide a direct voltage which is a function of rotor speed of the motor and therefore a function of drive wheel speed. This tachometer can take the form of frequency to voltage converter circuit which senses the pulse frequency of the power converter 26 and converts this to a direct average voltage. As an example the converter can comprise an integrator including a bistable transistor switching circuit.

It is pointed out once more that the power converter 26 determines the frequency of the current applied to motor 34 and thus may be thought of as a frequency changer in that it receives a current at alternator output frequency and converts it to the desired motor frequency.

Although only one propulsion motor and one driving wheel has been disclosed herein it is to be understood that a propulsion motor can be provided for each wheel of the vehicle and may include as many as six motors each individually coupled to a respective drive wheel. This of course requires a power converter for each drive motor but the power converters are supplied from one alternator.

To further explain the function of the engine race circuit it is seen from an inspection of FIG. 2 that a short circuit could occur in the power converter 26 should a pair of controlled rectifiers, for example controlled rectifiers 46C and 56B be gated conductive simultaneously. This might occur where the ratio of the output frequency of the generator 10 to motor input frequency and therefore switching frequency of the power converter drops below approximately 2.5 which mode of operation does not provide reliable commutation or turn off of the controlled rectifiers by the alternating current output of the generator. Thus, controlled rectifier 46C may not be commutated off before the 180° point as shown on FIG. 3 with the resultant short circuit. The race circuit prevents this by increasing engine speed and therefore output frequency of the generator to maintain the minimum frequency ratio.

The propulsion system of this invention is intended for use on trucks but will be useful on other vehicles such as locomotives and earthmovers.

I claim:

1. A motive power system for a vehicle having at least one driving wheel comprising, a prime mover, an alternating current generator having a polyphase output winding, means coupling said prime mover and generator, a traction motor having a polyphase winding and a rotor, means coupling said rotor to said wheel, a power converter comprised of a plurality of controlled rectifiers, said power converter connected between said output winding of said generator and said polyphase winding of said motor and operable to vary the frequency of the current supplied to said motor winding by the switching action of said controlled rectifiers, said controlled rectifiers being periodically biased off by the alternating current generated in said output winding of said generator, means responsive to the speed of rotation of said rotor for varying the output frequency of said power converter, and means for controlling the speed of rotation of said prime mover such that the ratio of output frequency of said generator to motor input frequency is maintained above a minimum value, said minimum value corresponding to a value below which a malfunction may occur in said power converter.

2. An electric propulsion system for a vehicle having at least one driving wheel comprising, a prime mover, an alternating current generator mechanically coupled to said prime mover having a polyphase output winding and a field winding, means for exciting said field winding, a traction motor having a polyphase winding and a rotor mechanically coupled to said drive wheel, a power converter comprised of a plurality of controlled rectifiers connected between the output winding of said alternating current generator and said polyphase winding of said motor, means coupled with the rotor of said motor for controlling the switching frequency of the controlled rectifiers of said power converter whereby the output frequency of said power converter is a function of motor rotor and drive wheel speed, said controlled rectifier being periodically biased off by the alternating current generated in said output winding of said generator, and means for reducing the energization of said field winding of said generator to thereby permit an increase in speed of said prime mover to increase generator output frequency whenever the ratio of the output frequency of said generator to the frequency of the current supplied to said motor drops to a predetermined value.

3. A propulsion system for a vehicle comprising, a traction motor having a polyphase input winding and a rotor, means mechanically coupling said rotor and a drive wheel of said vehicle, an engine, a fuel control means for controlling the amount of fuel supplied to said engine, an alternating current generator having a polyphase output winding and a field winding, said generator having a rotor mechanical mechanically coupled to said engine, a power converter comprised of a plurality of controlled rectifiers connected between said output winding of said generator and said polyphase winding of said motor, means for controlling the switching frequency of said controlled rectifiers of said power converter as a function of the speed of rotation of the rotor of said motor, a field control means for controlling the excitation of said field winding of said generator, a fuel control means for controlling the amount of fuel supplied to said engine, a manually operable device connected with said fuel control means for varying the setting of said fuel control means to thereby vary the amount of fuel supplied to said engine, means coupled to said field control means for varying the excitation of said field winding as a function of engine speed and the position of said manually operable device, said last named means operating to increase and decrease field current to control engine speed, and means coupled to said field control means for reducing field current to thereby cause said engine to increase its speed whenever the ratio of generator output frequency to motor input frequency drops below a predetermined value.

4. An electric propulsion system for a vehicle having a driving wheel comprising, an internal combustion engine, fuel control means including a throttle valve for controlling the amount of combustible mixture supplied to said engine, a manually operable device coupled to said throttle valve for adjusting said throttle valve, an alternating current generator having a polyphase output winding and a field winding, said generator having a rotor mechanically coupled to said engine, a traction motor having a rotor coupled to said wheel and a polyphase input winding, a switching circuit comprised of a plurality of controlled rectifiers connected between said output winding of said generator and said polyphase winding of said motor, said switching circuit operable to control the frequency of current applied to said motor irrespective of changes in output frequency of said generator, means for controlling the switching frequency of said switching circuit as a function of the speed of rotation of a said rotor of said traction motor, means for deriving a first signal which is a function of throttle valve position, means for deriving a second signal which is a function of engine speed, means for controlling the field excitation of said field winding in accordance with said first and second signals, means for deriving a third signal which is a function of the speed of rotation of the rotor of said motor, and means for decreasing the energization of said field winding of said generator to permit said engine to increase its speed in response to said second and third signals, said decrease in excitation occuring when said second and third signals have predetermined values and when the ratio of the output frequency of said generator to motor input frequency drops to a predetermined value.

5. An electric propulsion system for a vehicle having at least one driving wheel comprising, an internal combustion engine, a fuel controlling device including a shiftable throttle valve for said engine, a manually operable device for shifting said throttle valve, an alternating current generator having a polyphase output winding and a field winding, said alternating current generator having a rotor mechanically connected to said engine, a traction motor having a polyphase winding and a rotor mechanically coupled to said driving wheel, a power converter comprised of a plurality of controlled rectifiers connected between said output winding of said generator and said polyphase winding of said motor, means for gating groups of controlled rectifiers of said power converter conductive at a frequency which is a function of the speed of rotation of the rotor of said traction motor whereby an alternating current is supplied to said motor by said power converter, means coupled to said throttle valve for providing a first signal which is representative of the position of said throttle valve, means coupled to said engine for providing a second signal which is a function of engine speed, means for controlling the excitation of said field winding as a function of said first and second signals, means for reducing the energization of said field winding to thereby permit said engine to increase its speed when the ratio of the output frequency of said generator to input frequency of said motor drops below a predetermined value, a second throttle valve for controlling the amount of fuel supplied to said engine, and means responsive to said second signal for moving said second throttle valve towards a closed position to thereby limit engine speed to a predetermined value.

6. The propulsion system according to claim 5 where means are provided for moving said second throttle valve towards a closed position to reduce engine speed when the speed of said driving wheel exceeds a predetermined value.

7. A propulsion system for a vehicle having at least one driving wheel comprising, an internal combustion engine, a fuel induction system for said engine, first and second throttle valves controlling said induction system, a generator driven by said engine, a traction motor electrically connected to said generator and mechanically connected to said wheel, manually operable means for adjusting said first throttle valve, electrically energizable means for causing said second throttle valve to move toward a closed position to thereby reduce the speed of said engine, a first transistor connected to said electrically energizable means for energizing said electrically energizable means when said first transistor is biased conductive, a base circuit for said first transistor including the collector-emitter circuit of a second transistor, a third transistor having an emitter, collector and base, means connecting one of said emitter and collector of said third transitor with the base of said second transistor whereby said first and second transistors are biased conductive when said third transistor is biased nonconductive and vice versa, means connected with the base and emitter of said third transistor for developing a speed signal voltage which is a function of engine and generator speed, said speed signal voltage biasing said third transistor conductive and said first and second transistors nonconductive to maintain said second throttle valve open, and a circuit for biasing said second transistor conductive to thereby bias said first transistor conductive to close said second throttle valve when said signal voltage exceeds a predetermined magnitude, said last named circuit including a diode connected across the base and collector of said third transistor, the base-emitter circuit of said second transistor and a Zener diode.

8. The propulsion system according to claim 7 including means for deriving a voltage which is a function of drive wheel speed, a means for applying said voltage to the base of said second transistor whereby said second transistor is biased to conduct to bias said first transistor conductive and cause second throttle valve to move towards a closed position when vehicle speed exceeds a predetermined value.